United States Patent
Chen et al.

(10) Patent No.: US 10,641,329 B2
(45) Date of Patent: May 5, 2020

(54) POROUS ULTRASONIC BEARING

(71) Applicant: Shunde Polytechnic, Foshan, Guangdong (CN)

(72) Inventors: Xuefeng Chen, Guangdong (CN); Mingxia Tu, Guangdong (CN)

(73) Assignee: Shunde Polytechnic, Foshan (CN)

( * ) Notice: Subject to any disclaimer, the term of this patent is extended or adjusted under 35 U.S.C. 154(b) by 0 days.

(21) Appl. No.: 16/408,379

(22) Filed: May 9, 2019

(65) Prior Publication Data
US 2019/0264741 A1    Aug. 29, 2019

Related U.S. Application Data

(63) Continuation-in-part of application No. PCT/CN2018/081801, filed on Apr. 4, 2018.

(30) Foreign Application Priority Data

Jul. 25, 2017    (CN) .......................... 2017 1 0611198

(51) Int. Cl.
*F16C 32/00* (2006.01)
*F16C 32/04* (2006.01)

(52) U.S. Cl.
CPC .................................. *F16C 32/04* (2013.01)

(58) Field of Classification Search
CPC .. F16C 32/04; F16C 32/0421; F16C 32/0429; F16C 32/0431; F16C 32/0434; H01L 41/08; H01L 41/12; H01L 41/125
See application file for complete search history.

(56) References Cited

U.S. PATENT DOCUMENTS

| 5,562,004 A | * | 10/1996 | Kaise | ...................... G01L 3/102 |
| | | | | 427/374.6 |
| 2009/0045042 A1 | * | 2/2009 | Browne | .................. F16D 28/00 |
| | | | | 204/157.15 |

FOREIGN PATENT DOCUMENTS

| CN | 203130950 U | 8/2013 |
| CN | 104454986 A | 3/2015 |
| CN | 107152456 A | 9/2017 |
| CN | 107269697 A | * 10/2017 |
| JP | 2001032835 A | 2/2001 |

* cited by examiner

*Primary Examiner* — Phillip A Johnson
(74) *Attorney, Agent, or Firm* — Wayne & Ken, LLC; Tony Hom

(57) ABSTRACT

A porous ultrasonic bearing includes a ring, a high-strength outer casing, a bearing bushing and a vibration collar. The high-strength outer casing is sheathed on the bearing bushing, and a group of radial holes that penetrate are provided on the bearing bushing. The vibration collar is arranged between the high-strength outer casing and the bearing bushing. The outer cylindrical surface of the vibration collar is fixedly connected to the inner hole of the high-strength outer casing. A gap is provided between the inner hole of the vibration collar and the outer cylindrical surface of the bearing bushing. The vibration collar radially vibrates at high frequency. A high-strength lubricating oil film is formed between the inner hole of the bearing bushing and the shaft, so that the friction between the inner hole of the bearing bushing and the shaft is reduced.

6 Claims, 10 Drawing Sheets

POROUS ULTRASONIC BEARING

CROSS-REFERENCE TO RELATED APPLICATIONS

This application is a continuation in part of International Patent Application No. PCT/CN2018/081801 with a filing date of Apr. 4, 2018, designating the United States, now pending, and further claims the benefit of priority from Chinese Patent Application No. CN 201710611198.0, filed on Jul. 25, 2017. The content of the aforementioned application, including any intervening amendments thereto, is incorporated herein by reference in its entirety.

TECHNICAL FIELD

The present disclosure relates to coupling and power train technology of modern machinery, and more particularly to a porous ultrasonic bearing.

BACKGROUND

Bearings are the most widely used support and transmission parts in the existing machinery due to high transmission accuracy and extremely low frictional resistance, especially in the transmission of highly precise machines. However, the bearings also have the disadvantages of complicated manufacturing process and high production, use and maintenance costs.

It has been confirmed that ultrasonic vibration surface has suspension support and anti-friction abilities which have been applied in many fields. It has been found that ultrasonic waves can reduce the frictional resistance between contact surfaces by more than 90%. Many researchers have begun to use ultrasonic bearings, but the overall practical effect is not ideal.

SUMMARY

The present disclosure provides a porous ultrasonic bearing to overcome the deficiencies of the prior art. The porous ultrasonic bearing is capable of vibrating at high frequency to greatly reduce the friction between contact surfaces of transmission pairs, thus reducing the bearing transmission friction and improving the motion transfer accuracy. The porous ultrasonic bearing has long service life and reduced manufacturing and use costs.

In an aspect, the porous ultrasonic bearing includes a ring, a high-strength outer casing, a bearing bushing and a vibration collar. The high-strength outer casing is sheathed on the bearing bushing. The bearing bushing is provided with a group of radial holes that penetrate. The vibration collar is arranged between the high-strength outer casing and the bearing bushing. The outer cylindrical surface of the vibration collar is fixedly connected to the inner hole of the high-strength outer casing. A gap is provided between the inner hole of the vibration collar and the outer cylindrical surface of the bearing bushing. The vibration collar may radially vibrate at high frequency. Lubricating oil is filled between the inner hole of the bearing bushing and an shaft, in the group of radial holes of the bearing bushing and in the gap between the inner hole of the vibration collar and the outer cylindrical surface of the bearing bushing, and a high-strength lubricating oil film is formed between the inner hole of the bearing bushing and the shaft under radial high-frequency vibration of the vibration collar, so that the friction between the inner hole of the bearing bushing and the shaft is greatly reduced.

In this technical solution, the vibration collar may be of a piezoelectric material or a magnetostrictive material, and may be integrally formed, axially segmented or circumferentially segmented.

In an aspect, the porous ultrasonic bearing includes a ring, a high-strength outer casing, a bearing bushing, an end cap, a vibration collar and an axial vibration plate. The high-strength outer casing is sheathed on the bearing bushing. The bearing bushing is provided with a group of radial holes that penetrate. A group of axial holes that penetrate are provided at the bottom of the bearing bushing. The end cap is coupled to the bottom of the bearing bushing. The vibration collar is provided between the high-strength outer casing and the bearing bushing. The outer cylindrical surface of the vibration collar is fixedly connected to the inner hole of the high-strength outer casing. A gap is provided between the inner hole of the vibration collar and the outer cylindrical surface of the bearing bushing. The axial vibration plate is arranged between the bottom of the bearing bushing and the end cap. The axial vibration plate is fixedly connected to the end cap. A gap is provided between the axial vibration plate and the bottom of the bearing bushing. During operation, the vibration collar may radially vibrate at high frequency, and the axial vibration plate may vibrate at high frequency in the thickness direction. Lubricating oil is filled between the inner hole of the bearing bushing and a shaft, in the group of radial holes of the bearing bushing and in the gap between the outer cylindrical surface of the bearing bushing and the inner hole of the vibration collar. A high-strength lubricating oil film is formed between the inner hole of the bearing bushing and the shaft under radial high-frequency vibration of the vibration collar, so that the friction between the inner hole of the bearing bushing and the shaft is greatly reduced. Lubricating oil is filled between the bottom of the bearing bushing and an end surface of the shaft, in the group of axial holes at the bottom of the bearing bushing and in the gap between the axial vibration plate and the bottom of the bearing bushing, and a high-strength lubricating oil film is formed between the bottom of the bearing bushing and the end surface of the shaft under high-frequency vibration of the axial vibration plate in the thickness direction, so that the friction between the bottom of the bearing bushing and the end surface of the shaft is greatly reduced.

In this technical solution, the bottom of the bearing bushing is in a planar shape or a spherical shape, and the vibration collar is of a piezoelectric material or a magnetostrictive material. The vibration collar is integrally formed, axially segmented or circumferentially segmented. The axial vibration plate is of a piezoelectric material or a magnetostrictive material.

In an aspect, the porous ultrasonic bearing includes a ring, a high-strength outer casing, a bearing bushing and an end cap. The high-strength outer casing is sheathed on the bearing bushing. The bearing bushing is provided with a group of radial holes that penetrate. The end cap is coupled to the bottom of the bearing bushing. A group of axial holes that penetrate are provided at the bottom of the bearing bushing. The inner hole of the high-strength outer casing is a regular polygon. The outer part of the bearing bushing is a regular polygon. A radial vibration plate is fixed on each side of the regular polygon of the inner hole of the high-strength outer casing. The radial vibration plate is arranged opposite to a surface of the regular polygonal outer part of the bearing bushing. A gap is provided between the radial vibration plate and the regular polygonal outer part of the bearing bushing. An axial vibration plate is provided between the bottom of the bearing bushing and the end cap. The axial vibration plate is fixedly connected to the end cap. A gap is provided between the axial vibration plate and the bottom of the bearing bushing. During operation, the radial vibration plate may radially vibrate at high frequency in the thickness direction, and the axial vibration plate may vibrate at high frequency in the thickness direction. Lubricating oil is filled between the inner hole of the bearing bushing and an shaft, in the group of radial holes of the bearing bushing and in the gap between the regular polygonal outer part of the bearing bushing and the radial vibration plate. A high-strength lubricating oil film is formed between the inner hole of the bearing bushing and the shaft under high-frequency vibration of the radial vibration plate, so that the friction between the inner hole of the bearing bushing and the shaft is greatly reduced. Lubricating oil is filled between the bottom of the bearing bushing and an end surface of the shaft, in the group of axial holes at the bottom of the bearing bushing and in the gap between the axial vibration plate and the bottom of the bearing bushing, and a high-strength lubricating oil film is formed between the bottom of the bearing bushing and the end surface of the shaft under high-frequency vibration of the axial vibration plate in the thickness direction, so that the friction between the bottom of the bearing bushing and the end surface of the shaft is greatly reduced.

In this technical solution, the bottom of the bearing bushing is in a planar shape or a spherical shape. The radial vibration plate and the axial vibration plate are of piezoelectric materials or magnetostrictive materials.

The present disclosure over the prior art has simple structure and can vibrate at high frequency to form a high-strength lubricating oil film between a kinematic pair, so that the friction between contact surfaces of the kinematic pair is greatly reduced, and the motion transfer accuracy is improved. In addition, the porous ultrasonic bearing has long service life and reduced manufacturing and use costs.

DETAILED DESCRIPTION OF EMBODIMENTS

Figure 1:
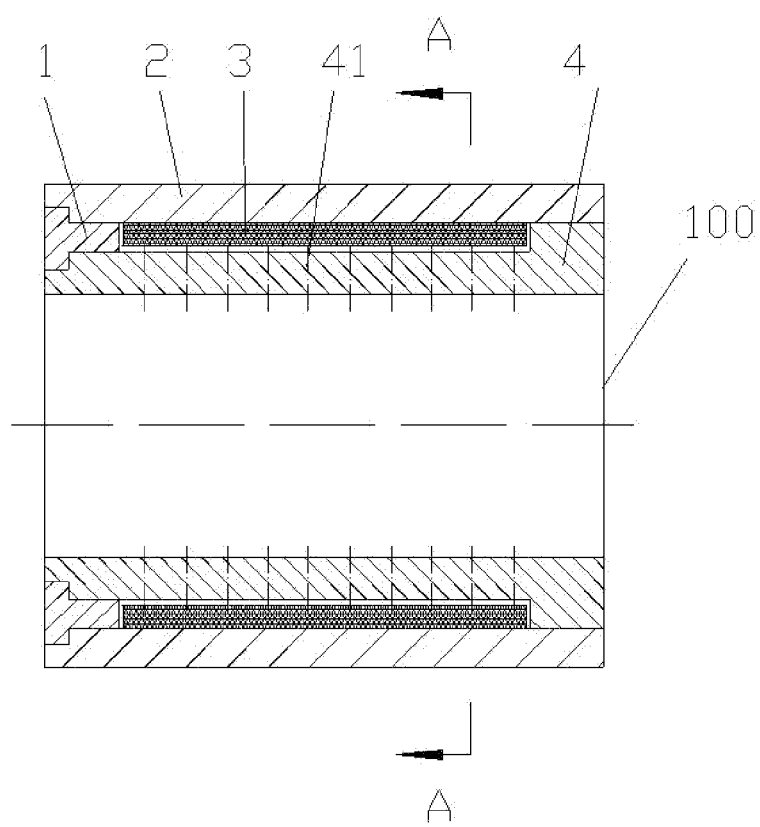
FIG. 1 is a schematic diagram of a first embodiment and a second embodiment according to the present invention.

The specific embodiments of the present disclosure will be described in detail below in conjunction with the accompanying drawings. It should be noted that the description of the embodiments is illustrative of, but not intended to limit, the present disclosure. In addition, the technical features involved in the embodiments described below may be combined mutually as long as they do not conflict with each other.

In the description of the present disclosure, terms "left", "right" and the like refer to orientation or positional relationship shown in the drawings, which are merely for better description of the present disclosure and do not require that the present disclosure must be in specific positional configurations with specific operations. They are not intended to limit the present disclosure.

Example 1

Figure 2:
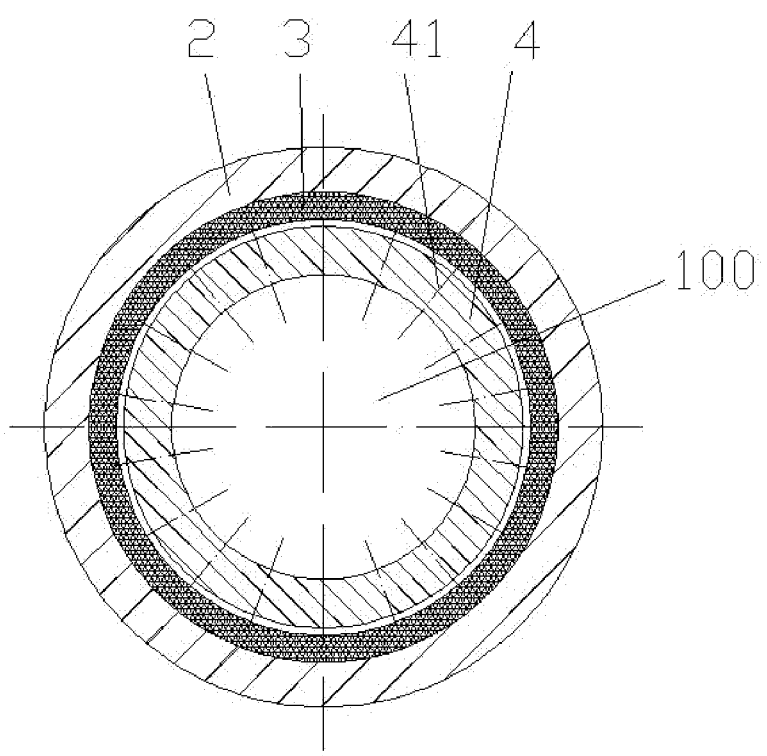
FIG. 2 is a cross-sectional view taken along an A-A line of FIG. 1 in which a vibration collar is integrally formed.

As shown in FIGS. 1 and 2, a porous ultrasonic bearing includes a ring 1, a high-strength outer casing 2, a vibration collar 3 and a bearing bushing 4. The high-strength outer casing 2 is sheathed on the bearing bushing 4. The bearing bushing 4 is provided with a group of radial holes 41 that penetrate. The vibration collar 3 is arranged between the high-strength outer casing 2 and the bearing bushing 4. The outer cylindrical surface of the vibration collar 3 is fixedly connected to the inner hole of the high-strength outer casing 2. A gap is provided between the inner hole of the vibration collar 3 and the outer cylindrical surface of the bearing bushing 4. The vibration collar 3 may radially vibrate at high frequency. Lubricating oil is filled between the inner hole of the bearing bushing 4 and an shaft 100, in the group of radial holes 41 of the bearing bushing 4 and in the gap between the inner hole of the vibration collar 3 and the outer cylindrical surface of the bearing bushing 4, and a high-strength lubricating oil film is formed between the inner hole of the bearing bushing 4 and the shaft 100 under radial high-frequency vibration of the vibration collar 3, so that the friction between the inner hole of the bearing bushing 4 and the shaft 100 is greatly reduced.

In this embodiment, the vibration collar 3 is integrally formed, as shown in FIG. 2.

Example 2

Figure 3:
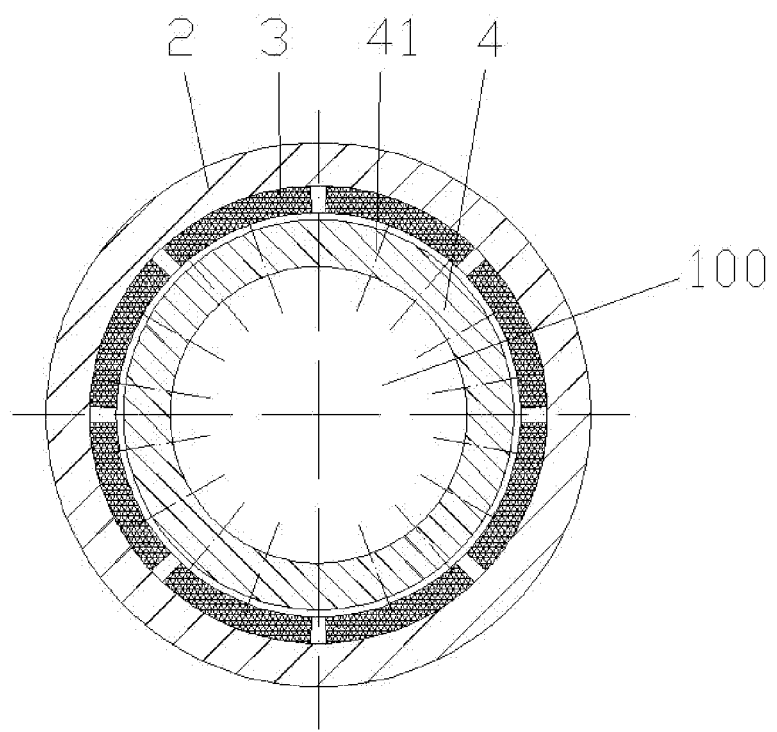
FIG. 3 is a cross-sectional view taken along an A-A line of FIG. 1 in which the vibration collar is circumferentially segmented.

As shown in FIGS. 1 and 3, a porous ultrasonic bearing includes a ring 1, a high-strength outer casing 2, a vibration collar 3 and a bearing bushing 4. The high-strength outer casing 2 is sheathed on the bearing bushing 4. The bearing bushing 4 is provided with a group of radial holes 41 that penetrate. The vibration collar 3 is arranged between the high-strength outer casing 2 and the bearing bushing 4. The outer cylindrical surface of the vibration collar 3 is fixedly connected to the inner hole of the high-strength outer casing 2. A gap is provided between the inner hole of the vibration collar 3 and the outer cylindrical surface of the bearing bushing 4. The vibration collar 3 may radially vibrate at high frequency. Lubricating oil is filled between the inner hole of the bearing bushing 4 and an shaft 100, in the group of radial holes 41 of the bearing bushing 4 and in the gap between the inner hole of the vibration collar 3 and the outer cylindrical surface of the bearing bushing 4, and a high-strength lubricating oil film is formed between the inner hole of the bearing bushing 4 and the shaft 100 under the action of high-frequency vibration of the vibration collar 3, so that the friction between the inner hole of the bearing bushing 4 and the shaft 100 is greatly reduced.

In this embodiment, the vibration collar 3 is circumferentially segmented as shown in FIG. 3.

Example 3

Figure 4:
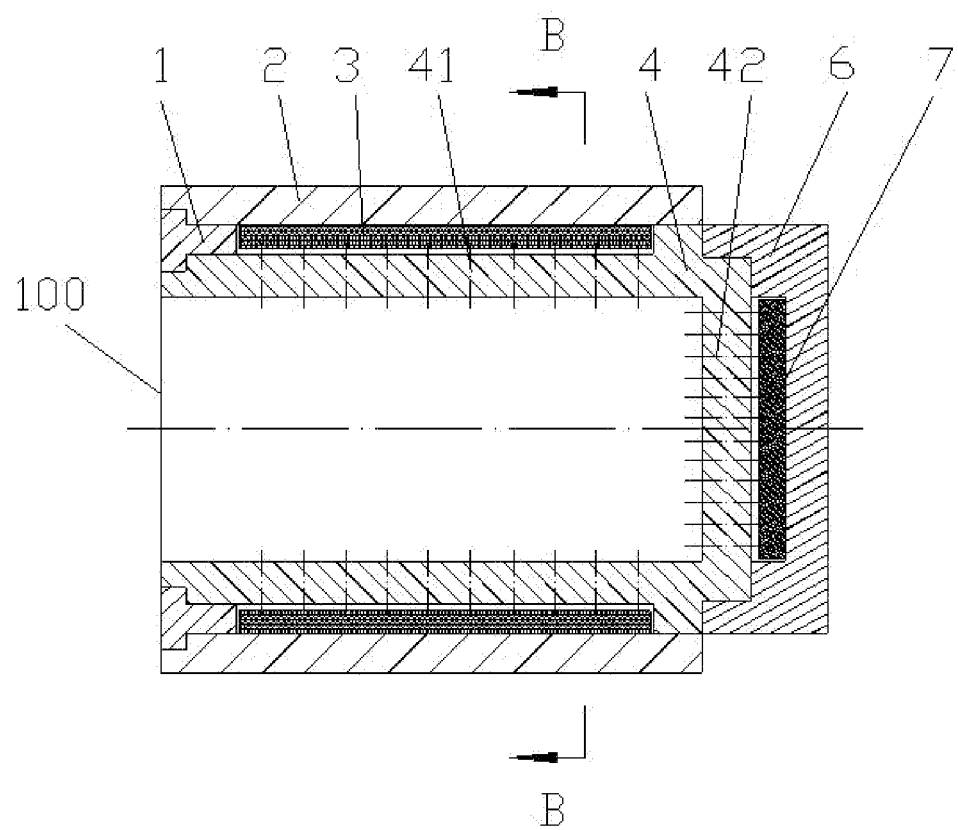
FIG. 4 is a schematic diagram of a third embodiment according to the present invention.
Figure 5:
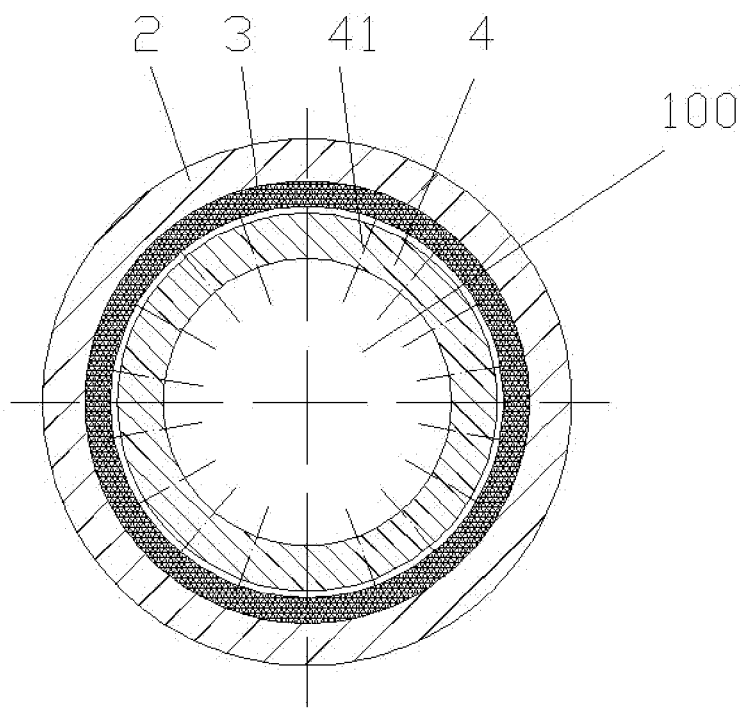
FIG. 5 is a cross-sectional view taken along a B-B line in FIG. 4 in which the vibration collar is integrally formed.

As shown in FIGS. 4 and 5, a porous ultrasonic bearing includes a ring 1, a high-strength outer casing 2, a bearing bushing 4, an end cap 6, a vibration collar 3 and an axial vibration plate 7. The high-strength outer casing 2 is sheathed on the bearing bushing 4. The bearing bushing 4 is provided with a group of radial holes 41 that penetrate. The end cap 6 is coupled to the bottom of the bearing bushing 4. The vibration collar 3 is arranged between the high-strength outer casing 2 and the bearing bushing 4. The outer cylindrical surface of the vibration collar 3 is fixedly connected to the inner hole of the high-strength outer casing 2. A gap is provided between the inner hole of the vibration collar 3 and the outer cylindrical surface of the bearing bushing 4. The axial vibration plate 7 is provided between the bottom of the bearing bushing 4 and the end cap 6, and is fixedly connected to the end cap 6. A gap is provided between the axial vibration plate 7 and the bottom of the bearing bushing 4. During operation, the vibration collar 3 may radially vibrate at high frequency, and the axial vibration plate 7 may vibrate at high frequency in the thickness direction. Lubricating oil is filled between the inner hole of the bearing bushing 4 and an shaft 100, in the group of radial holes 41 of the bearing bushing 4 and in the gap between the inner hole of the vibration collar 3 and the outer cylindrical surface of the bearing bushing 4, and a high-strength lubricating oil film is formed between the inner hole of the bearing bushing 4 and the shaft 100 under high-frequency vibration of the vibration collar 3, so that the friction between the inner hole of the bearing bushing 4 and the shaft 100 is greatly reduced. Lubricating oil is filled between the bottom of the bearing bushing and an end surface of the shaft, in the group of axial holes at the bottom of the bearing bushing and in the gap between the axial vibration plate and the bottom of the bearing bushing, and a high-strength lubricating oil film is formed between the bottom of the bearing bushing and the end surface of the shaft under high-frequency vibration of the axial vibration plate in the thickness direction, so that the friction between the bottom of the bearing bushing and the end surface of the shaft is greatly reduced. Such porous ultrasonic bearing may be adapted to relatively larger radial and axial forces.

In this embodiment, the bottom of the bearing bushing 4 is in a planar shape, and the vibration collar 3 is integrally formed.

Example 4

Figure 6:
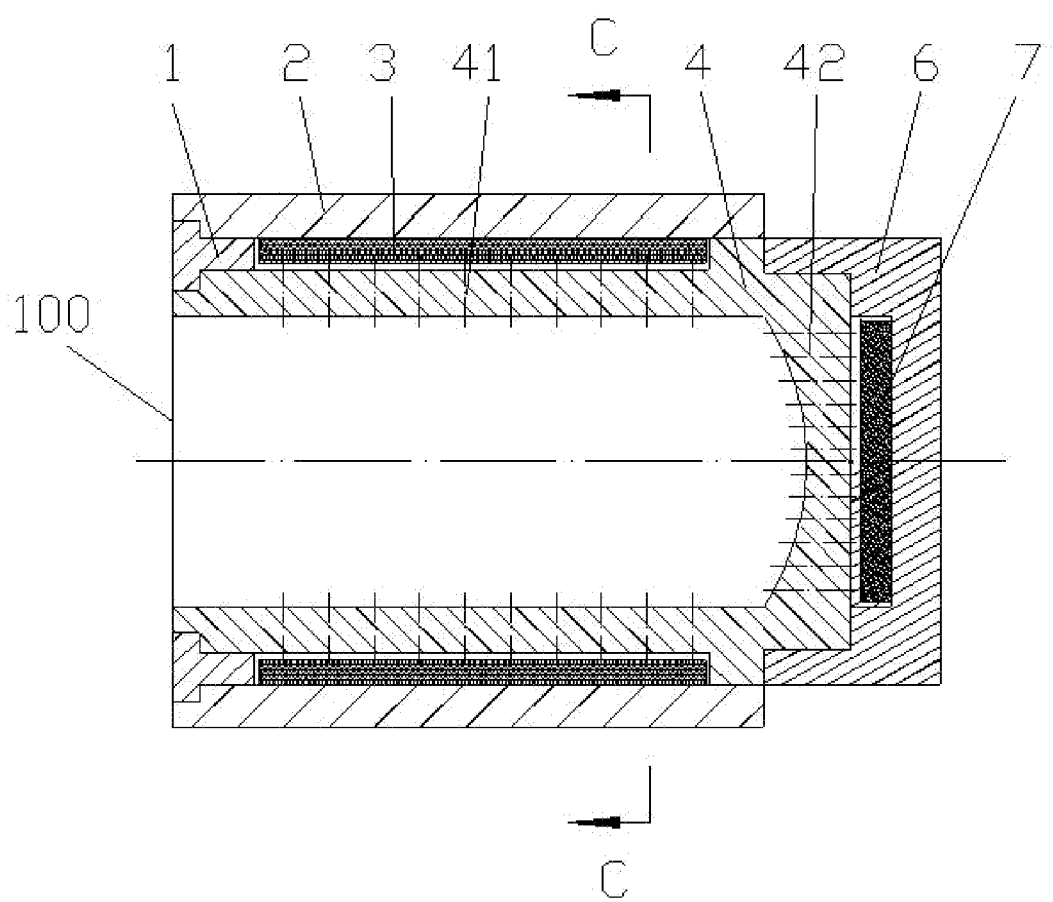
FIG. 6 is a schematic diagram of a fourth embodiment according to the present invention.
Figure 7:
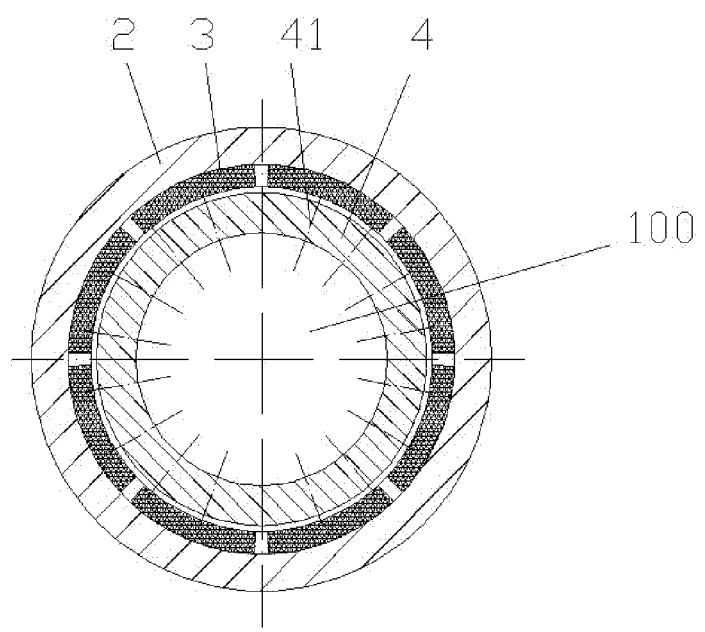
FIG. 7 is a cross-sectional view taken along a C-C line in FIG. 6 in which the vibration collar is circumferentially segmented.

As shown FIGS. 6 and 7, a porous ultrasonic bearing includes a ring 1, a high-strength outer casing 2, a vibration collar 3, a bearing bushing 4, an end cap 6 and an axial vibration plate 7. The high-strength outer casing 2 is sheathed on the bearing bushing 4. The bearing bushing 4 is provided with a group of radial holes 41 that penetrate. A group of axial holes 42 that penetrate are provided at the bottom of the bearing bushing 4. The end cap 6 is coupled to the bottom of the bearing bushing 4. The vibration collar 3 is arranged between the high-strength outer casing 2 and the bearing bushing 4. The outer cylindrical surface of the vibration collar 3 is fixedly connected to the inner hole of the high-strength outer casing 2. A gap is provided between the inner hole of the vibration collar 3 and the outer cylindrical surface of the bearing bushing 4. The axial vibration plate 7 is provided between the bottom of the bearing bushing 4 and the end cap 6, and is fixedly connected to the end cap 6. A gap is provided between the axial vibration plate 7 and the bottom of the bearing bushing 4. During operation, the vibration collar 3 may radially vibrate at high frequency, and the axial vibration plate 7 may vibrate at high frequency in the thickness direction. Lubricating oil is filled between the inner hole of the bearing bushing 4 and an shaft 100, in the group of radial holes 41 of the bearing bushing 4 and in the gap between the outer cylindrical surface of the bearing bushing 4 and the inner hole of the vibration collar 3, and a high-strength lubricating oil film is formed between the inner hole of the bearing bushing 4 and the shaft 100 under the high-frequency vibration of the vibration collar 3, so that the friction between the inner hole of the bearing bushing 4 and the shaft 100 is greatly reduced. Lubricating oil is filled between the bottom of the bearing bushing 4 and an end surface of the shaft 100, in the group of axial holes 42 at the bottom of the bearing bushing 4 and in the gap between the axial vibration plate 7 and the bottom of the bearing bushing 4, and a high-strength lubricating oil film is formed between the bottom of the bearing bushing 4 and the end surface of the shaft 100 under high-frequency vibration of the axial vibration plate 7 in the thickness direction, so that the friction between the bottom of the bearing bushing 4 and the end surface of the shaft is greatly reduced. Such porous ultrasonic bearing may be adapted to relatively larger radial and axial forces.

In this embodiment, the bottom of the bearing bushing 4 is in a planar shape, and the vibration collar 3 is circumferentially segmented.

Example 5

Figure 8:
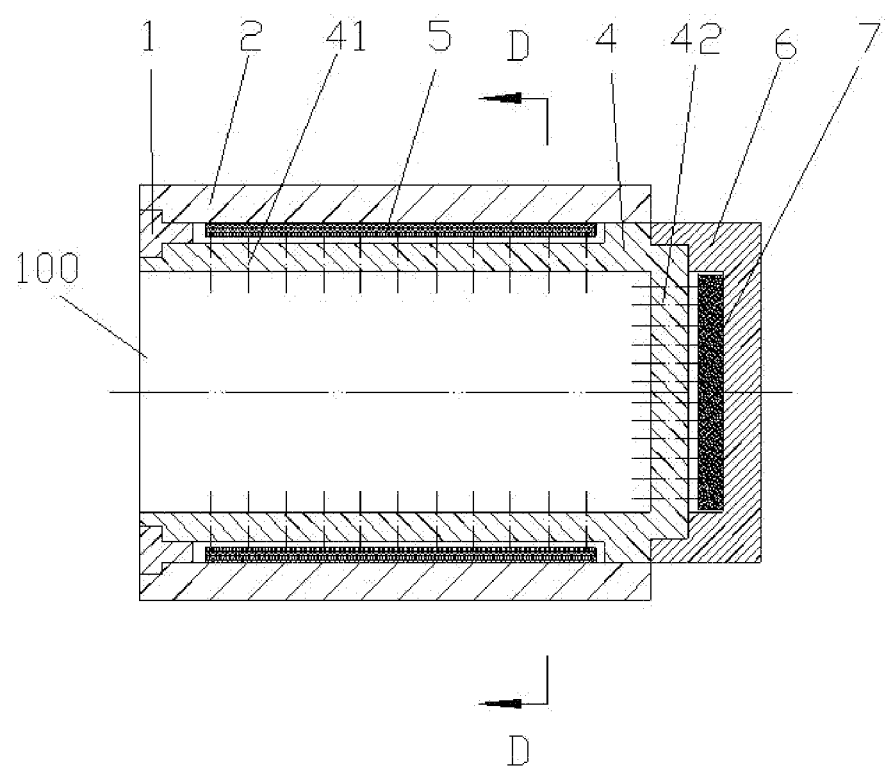
FIG. 8 is a schematic diagram of a fifth embodiment according to the present invention.
Figure 10:
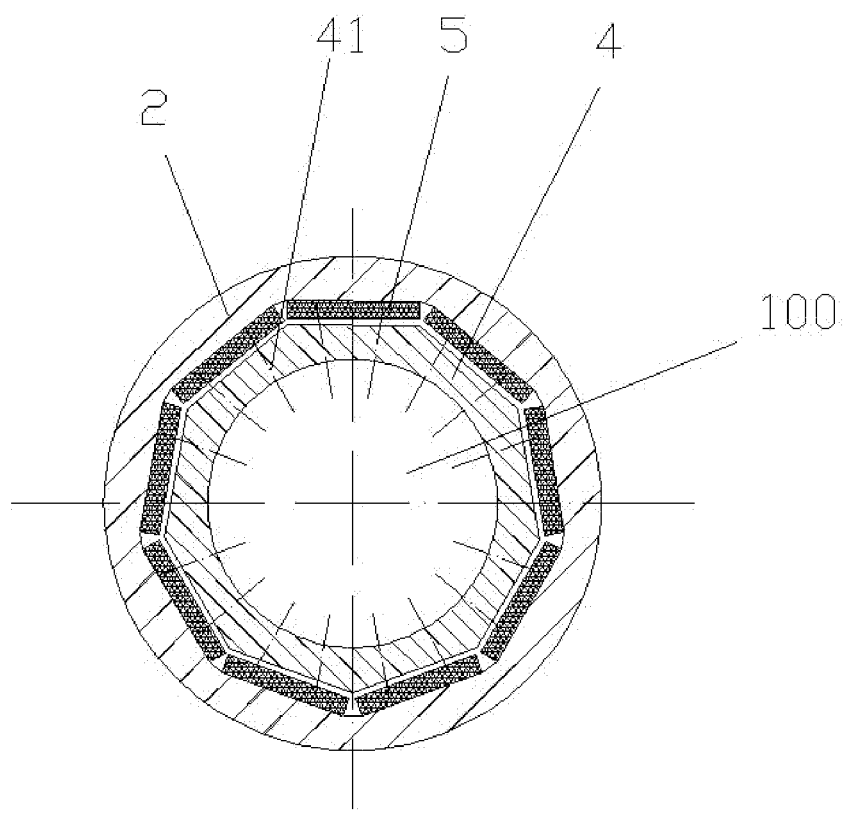
FIG. 10 is a cross-sectional view taken along a D-D line in FIG. 8 and an E-E line in FIG. 9.

As shown FIGS. 8 and 10, a porous ultrasonic bearing includes a ring 1, a high-strength outer casing 2, a bearing bushing 4 and an end cap 6. The high-strength outer casing 2 is sheathed on the bearing bushing 4. The bearing bushing 4 is provided with a group of radial holes 41 that penetrate. The end cap 6 is coupled to the bottom of the bearing bushing 4. A group of axial holes 42 that penetrate are provided at the bottom of the bearing bushing 4. The inner hole of the high-strength outer casing 2 is a regular polygon. The outer part of the bearing bushing 4 is a regular polygon. A radial vibration plate 5 is fixed on each side of the regular polygon of the inner hole of the high-strength outer casing 2. The radial vibration plate 5 is arranged opposite to a surface of the regular polygonal outer part of the bearing bushing 4, and a gap is provided between the radial vibration plate 5 and the regular polygonal outer part of the bearing bushing 4. The radial vibration plate 5 may vibrate at high frequency in the thickness direction during operation. The axial vibration plate 7 is provided between the bottom of the bearing bushing 4 and the end cap 6, and is fixedly connected to the end cap 6. A gap is provided between the axial vibration plate 7 and the bottom of the bearing bushing 4. During operation, the axial vibration plate 7 may vibrate at high frequency in the thickness direction. Lubricating oil is filled between the inner hole of the bearing bushing 4 and an shaft 100, in the group of radial holes 41 of the bearing bushing 4 and in the gap between the regular polygonal outer part of the bearing bushing 4 and the radial vibration plate 5, and a high-strength lubricating oil film is formed between the inner hole of the bearing bushing 4 and the shaft 100 under high-frequency vibration of the radial vibration plate 5 in the thickness direction, so that the friction between the inner hole of the bearing bushing 4 and the shaft 100 is greatly reduced. Lubricating oil is filled between the bottom of the bearing bushing 4 and an end surface of the shaft 100, in the group of axial holes 42 at the bottom of the bearing bushing 4 and in the gap between the axial vibration plate 7 and the bottom of the bearing bushing 4, and a high-strength lubricating oil film is formed between the bottom of the bearing bushing 4 and the end surface of the shaft under high-frequency vibration of the axial vibration plate 7 in the thickness direction, so that the friction between the bottom of the bearing bushing 4 and the end surface of the shaft 100 is greatly reduced. The porous ultrasonic bearing can withstand larger radial and axial forces.

In this embodiment, the bottom of the bearing bushing 4 is in a planar shape, as shown in FIG. 8.

Example 6

Figure 9:
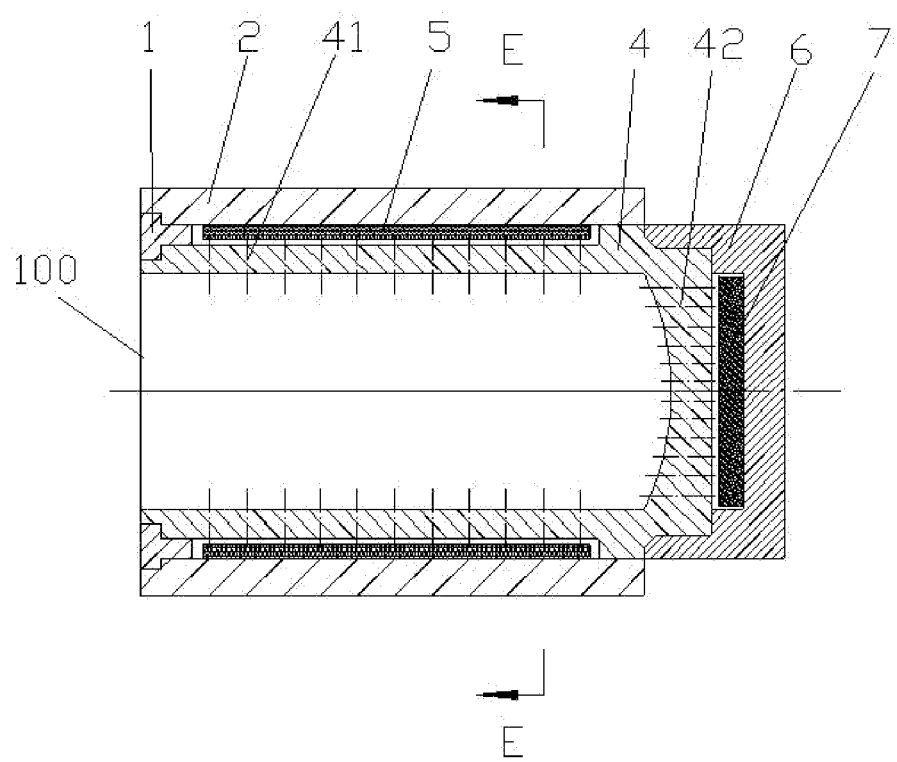
FIG. 9 is a schematic diagram of a sixth embodiment according to the present invention.

As shown FIGS. 9 and 10, a porous ultrasonic bearing includes a ring 1, a high-strength outer casing 2, a bearing bushing 4 and an end cap 6. The high-strength outer casing 2 is sheathed on the bearing bushing 4. The bearing bushing 4 is provided with a group of radial holes 41 that penetrate. The end cap 6 is coupled to the bottom of the bearing bushing 4. A group of axial holes 42 that penetrate are provided at the bottom of the bearing bushing 4. The inner hole of the high-strength outer casing 2 is a regular polygon. The outer part of the bearing bushing 4 is a regular polygon. A radial vibration plate 5 is fixed on each side of the regular polygon of the inner hole of the high-strength outer casing 2. The radial vibration plate 5 is arranged opposite to a surface of the regular polygonal outer part of the bearing bushing 4, and a gap is provided between the radial vibration plate 5 and the regular polygonal outer part of the bearing bushing 4. The radial vibration plate 5 may vibrate at high frequency in the thickness direction during operation. The axial vibration plate 7 is provided between the bottom of the bearing bushing 4 and the end cap 6, and is fixedly connected to the end cap 6. A gap is provided between the axial vibration plate 7 and the bottom of the bearing bushing 4. During operation, the axial vibration plate 7 may vibrate at high frequency in the thickness direction. Lubricating oil is filled between the inner hole of the bearing bushing 4 and an shaft 100, in the group of radial holes 41 of the bearing bushing 4 and in the gap between the regular polygonal outer part of the bearing bushing 4 and the radial vibration plate, and a high-strength lubricating oil film is formed between the inner hole of the bearing bushing 4 and the shaft 100 under high-frequency vibration of the radial vibration plate 5 in the thickness direction, so that the friction between the inner hole of the bearing bushing 4 and the shaft 100 is greatly reduced. Lubricating oil is filled between the bottom of the bearing bushing 4 and an end surface of the shaft 100, in the group of axial holes 42 at the bottom of the bearing bushing 4 and in the gap between the axial vibration plate 7 and the bottom of the bearing bushing 4, and a high-strength lubricating oil film is formed between the bottom of the bearing bushing 4 and the end surface of the shaft 100 under high-frequency vibration of the axial vibration plate 7 in the thickness direction, so that the friction between the bottom of the bearing bushing 4 and the end surface of the shaft 100 is greatly reduced. Such porous ultrasonic bearing may be adapted to relatively larger radial and axial forces.

In this embodiment, the bottom of the bearing bushing 4 is in a spherical shape as shown in FIG. 9.

In the above embodiments, the vibration collar 3, the radial vibration plate 5 and the axial vibration plate 7 may be of piezoelectric materials, magnetostrictive materials or other materials capable of generating high-frequency vibration.

Piezoelectric and magnetostrictive materials and related vibration, transduction and control technologies are known in the art and thus are not described in detail herein.

In addition, technologies such as hydraulics, oil supply, piping, sealing and packing related to the present invention are known in the art and thus are not described in detail herein in terms of schematic diagrams and descriptions.

The above embodiments described in detail with reference to the drawings are not intended to limit the present invention. Various alternations, modifications, replacements and variations of the above embodiments made by those skilled in the art without departing from the spirit and idea of the present application should fall within the scope of claims.

What is claimed is:

1. A porous ultrasonic bearing, comprising:
   a ring,
   an outer casing,
   a bearing bushing, and
   a vibration collar,
   wherein the outer casing is sheathed on the bearing bushing; the bearing bushing is provided with a group of radial holes that penetrate; the vibration collar is arranged between the outer casing and the bearing bushing; an outer cylindrical surface of the vibration collar is fixedly connected to an inner hole of the outer casing; and a gap is provided between an inner hole of the vibration collar and an outer cylindrical surface of the bearing bushing; the vibration collar radially vibrates at high frequency; lubricating oil is filled between an inner hole of the bearing bushing and an shaft, in the group of radial holes of the bearing bushing and in the gap between the inner hole of the vibration collar and the outer cylindrical surface of the bearing bushing; and a lubricating oil film is formed between the inner hole of the bearing bushing and the shaft under radial high-frequency vibration of the vibration collar, so that friction between the inner hole of the bearing bushing and the shaft is reduced.

2. The porous ultrasonic bearing of claim 1, wherein the vibration collar is of a piezoelectric material or a magnetostrictive material; and the vibration collar is integrally formed, axially segmented or circumferentially segmented.

3. A porous ultrasonic bearing, comprising:
   a ring,
   an outer casing,
   a bearing bushing,
   an end cap,
   a vibration collar, and
   an axial vibration plate,
   wherein the outer casing is sheathed on the bearing bushing; the bearing bushing is provided with a group of radial holes that penetrate; a group of axial holes that penetrate are provided at a bottom of the bearing bushing; the end cap is coupled to the bottom of the bearing bushing; the vibration collar is arranged between the outer casing and the bearing bushing; an outer cylindrical surface of the vibration collar is fixedly connected to an inner hole of the outer casing; a gap is provided between the inner hole of the vibration collar and the outer cylindrical surface of the bearing bushing; the axial vibration plate is arranged between the bottom of the bearing bushing and the end cap; the axial vibration plate is fixedly connected to the end cap; a gap is provided between the axial vibration plate and the bottom of the bearing bushing; and the vibration collar radially vibrates at high frequency and the axial vibration plate vibrates at high frequency in a thickness direction during operation; lubricating oil is filled between the inner hole of the bearing bushing and an shaft, in the group of radial holes of the bearing bushing and in the gap between the outer cylindrical surface of the bearing bushing and the inner hole of the vibration collar; and a lubricating oil film is formed between the inner hole of the bearing bushing and the shaft under high-frequency vibration of the radial vibration plate, so that the friction between the inner hole of the bearing bushing and the shaft is reduced; lubricating oil is filled between the bottom of the bearing bushing and an end surface of the shaft, in the group of axial holes at the bottom of the bearing bushing and in the gap between the axial vibration plate and the bottom of the bearing bushing; and a lubricating oil film is formed between the bottom of the bearing bushing and the end surface of the shaft under high-frequency vibration of the axial vibration plate in a thickness direction, so that the friction between the bottom of the bearing bushing and the end surface of the shaft is reduced.

4. The porous ultrasonic bearing of claim 3, wherein the bottom of the bearing bushing is in a planar shape or a spherical shape; the vibration collar is of a piezoelectric material or a magnetostrictive material; the vibration collar is integrally formed, axially segmented or circumferentially segmented; and the axial vibration plate is of a piezoelectric material or a magnetostrictive material.

5. A porous ultrasonic bearing, comprising:
a ring,
an outer casing,
a bearing bushing, and
an end cap,
wherein the outer casing is sheathed on the bearing bushing; the bearing bushing is provided with a group of radial holes that penetrate; the end cap is coupled to the bottom of the bearing bushing; a group of axial holes that penetrate are provided at a bottom of the bearing bushing; the inner hole of the outer casing is a regular polygon; the outer part of the bearing bushing is a regular polygon; a radial vibration plate is fixed on each side of the regular polygon of the inner hole of the outer casing; the radial vibration plate is arranged opposite to a surface of the regular polygonal outer part of the bearing bushing; a gap is provided between the radial vibration plate and the regular polygonal outer part of the bearing bushing; the radial vibration plate vibrates at high frequency in a thickness direction during operation; an axial vibration plate is arranged between the bottom of the bearing bushing and the end cap; the axial vibration plate is fixedly connected to the end cap; a gap is provided between the axial vibration plate and the bottom of the bearing bushing; the axial vibration plate vibrates at high frequency in a thickness direction during operation; lubricating oil is filled between the inner hole of the bearing bushing and an shaft, in the group of radial holes of the bearing bushing and in the gap between the outer regular polygonal outer part of the bearing bushing and the radial vibration plate; a lubricating oil film is formed between the inner hole of the bearing bushing and the shaft under high-frequency vibration of the radial vibration plate in a thickness direction, so that the friction between the inner hole of the bearing bushing and the shaft is reduced; lubricating oil is filled between the bottom of the bearing bushing and an end surface of the shaft, in the group of axial holes at the bottom of the bearing bushing and in the gap between the axial vibration plate and the bottom of the bearing bushing, and a lubricating oil film is formed between the bottom of the bearing bushing and the end surface of the shaft under high-frequency vibration of the axial vibration plate in a thickness direction, so that the friction between the bottom of the bearing bushing and the end surface of the shaft is reduced.

6. The porous ultrasonic bearing of claim 5, wherein the bottom of the bearing bushing is in a planar shape or a spherical shape; and the radial vibration plate and the axial vibration plate are of a piezoelectric material or a magnetostrictive material.

* * * * *